United States Patent
Lindteigen

(10) Patent No.: US 9,690,598 B2
(45) Date of Patent: Jun. 27, 2017

(54) REMOTELY ESTABLISHING DEVICE PLATFORM INTEGRITY

(71) Applicant: Ty Brendan Lindteigen, Chandler, AZ (US)

(72) Inventor: Ty Brendan Lindteigen, Chandler, AZ (US)

(73) Assignee: SAIFE, Inc. AZ (US)

( * ) Notice: Subject to any disclaimer, the term of this patent is extended or adjusted under 35 U.S.C. 154(b) by 632 days.

(21) Appl. No.: 13/855,713

(22) Filed: Apr. 3, 2013

(65) Prior Publication Data

US 2014/0195793 A1 Jul. 10, 2014

Related U.S. Application Data

(63) Continuation-in-part of application No. 13/738,987, filed on Jan. 10, 2013, now Pat. No. 8,966,249.

(51) Int. Cl.
G06F 9/44 (2006.01)
H04L 29/06 (2006.01)

(52) U.S. Cl.
CPC .......... *G06F 9/4421* (2013.01); *H04L 63/123* (2013.01); *H04L 63/1441* (2013.01)

(58) Field of Classification Search
CPC ............ G06F 11/0709; G06F 11/0766; G06F 11/3006; G06F 11/3051; G06F 21/564; G06F 21/602; G06F 21/73; H04L 9/28
See application file for complete search history.

(56) References Cited

U.S. PATENT DOCUMENTS

| | | | | |
|---|---|---|---|---|
| 8,566,481 B2* | 10/2013 | Ver Steeg | ............... | H04L 12/66 710/10 |
| 2002/0091944 A1* | 7/2002 | Anderson | .............. | G06Q 10/06 709/223 |
| 2005/0038827 A1* | 2/2005 | Hooks | ................. | G06F 11/0748 |
| 2005/0289401 A1* | 12/2005 | Goin | .................... | G06F 11/0709 714/47.3 |
| 2006/0156129 A1* | 7/2006 | Midgley | .................... | G06F 8/65 714/732 |
| 2010/0005529 A1* | 1/2010 | Hemade | .............. | H04L 41/0869 726/22 |
| 2011/0093703 A1* | 4/2011 | Etchegoyen | ............ | G06F 21/57 713/168 |
| 2012/0254361 A1* | 10/2012 | Malkhasyan | ........... | G06F 21/57 709/218 |

(Continued)

*Primary Examiner* — Kim Huynh
*Assistant Examiner* — Brandon Kinsey

(57) ABSTRACT

This invention includes apparatus, systems, and methods for repairing a corrupted device still in the field by sending the corrupted device a known-good configuration derived from the majority group of devices in the field. First, an initial inventory and content scan of the device's hardware and software stack is taken. The attestation server uses the collection of results to determine a statistically known-good configuration for each type of device. The attestation server groups the known good devices by devices and ideally all of the devices of the same type are configured mostly the same. The attestation server sends an alert to the device that the device is configured differently than the plurality of existing devices. Finally, the attestation server will request a known-good configuration from one of the devices in the plurality of existing devices to repair the corrupted device in the field.

13 Claims, 2 Drawing Sheets

(56) References Cited

U.S. PATENT DOCUMENTS

2013/0111547 A1* 5/2013 Kraemer ............... G06F 21/552
  726/1
2013/0326029 A1* 12/2013 Flynn .................. H04L 41/0803
  709/220

* cited by examiner

REMOTELY ESTABLISHING DEVICE PLATFORM INTEGRITY

CROSS-REFERENCE TO RELATED APPLICATIONS

The present application is related to and claims priority from prior provisional application Ser. No. 61/591,987 filed Jan. 29, 2012 and non-provisional application Ser. No. 13/738,987 filed Jan. 10, 2013 the contents of which are incorporated herein by reference.

FIELD OF THE INVENTION

This invention relates generally to the field of securing data on devices, and particularly remotely reestablishing platform integrity and security when a device has been compromised in the field.

BACKGROUND OF THE INVENTION

Technical advances and the prolific use of communication, computing, or electronic mobile or fixed devices, such as smart phones, tablet PC's, notebook PC's, and desktop PC's, have placed powerful computers readily in the hands of many people. These powerful devices produce significant amounts of data including sensitive personal, corporate, and government interests. Malware attacks against such computing devices have become pervasive and threaten unauthorized access and use of the sensitive data. Private, corporate, and government entities have a vested interest in protecting sensitive data stored, processed, and transmitted across extensive wire and wireless communication networks. Hence, there is an urgent need for an efficient solution to prevent the unauthorized access and use of sensitive data.

Existing solutions are limited because they focus on isolating all applications from each other, as opposed to isolating the secure applications from everything else. In addition, existing techniques such as writing a new kernel in a secured development environment or virtualizing the kernel and device drivers to run under a hypervisor require device-specific software and a system image unique to each type of device. Furthermore, existing solutions such as anti-virus, spyware scanners, and firewall software and services are susceptible to malware that circumvents them by modifying the underlying platform upon which they execute, and may allow the unauthorized access and use of sensitive data.

This invention provides a solution to protect sensitive data from unauthorized access and use. This invention includes practical data separation techniques that provide granulated control of sensitive data. This solution provides a complete solution against the adverse effects of malware by combining platform integrity with secure data management. This invention provides superior advantages in the marketplace by adding platform integrity through remote attestation across several devices to determine a statistically known-good configuration compared to looking for malware signatures or whitelist of software inventories. The invention enables a corrupted device still in the field to be repaired by sending the corrupted device a known-good configuration derived from the majority group of devices in the field.

BRIEF SUMMARY OF THE INVENTION

In one embodiment of the invention is a system to ensure the security and integrity of computing, or electronic mobile or fixed devices comprising a majority of like devices. The devices include application software installed and coupled to the devices' hardware and software stack to execute data encryption and remote attestation. The application software is installed within the device to encrypt data entering and leaving any secured applications within the device and to encrypt all data leaving the device. The application software also enables remote attestation including modifying the hardware and software stack so the attestation server will be able to remotely command the device to perform inventory and content scans of the device's hardware and software stack. Next the devices are coupled to a wired or wireless communication network. Finally, the devices communicate with an attestation server through the communication network.

In another embodiment of the invention is a process for repairing a corrupted device still in the field by sending the corrupted device a known-good configuration derived from the pristine device or the majority group of devices in the field. First, an initial inventory and content scan of many devices' hardware and software stack is taken. Next, the results of the inventory and content scans of the devices are transmitted across a communication network to the attestation server. Next, the consolidated and encrypted results of the inventory and content scan of the devices' hardware and software stack are sent to the attestation server via the communication network. Next, the attestation server stores the consolidated and encrypted results of the inventory and content scan of the devices' hardware and software stack in a storage database for comparison to other results sent by the devices. Next, the attestation server uses the collection of all results to determine a statistically known-good configuration for each type of device, herein referred to as the "plurality of existing devices." The attestation server groups the known good devices by devices and ideally all of the devices of the same type are configured mostly the same (i.e. the "plurality of existing devices"). The attestation server will compare the most recent result with the configuration for the group or the plurality of existing devices. Next, the attestation server notes any differences in the most recent result compared to the plurality of existing devices. The attestation server sends an alert to the device that the device is configured differently than the plurality of existing devices. The device that is configured differently than the plurality of existing devices is categorized by the attestation server as a minority group. If no differences were noted the attestation server may send an alert to the device indicating that the device is configured the same as the determined statistically known-good configuration. Finally, the attestation server will request a known-good configuration (e.g. an uncorrupted boot image) from one of the devices in the plurality of existing devices.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
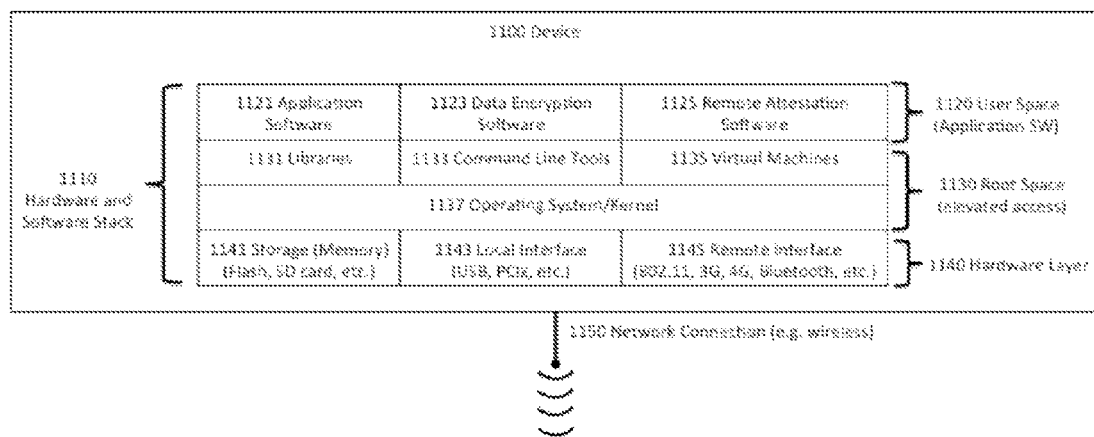
FIG. 1 is a diagram illustrating a computing, or electronic mobile or fixed device in accordance with the teachings of the present invention.

FIG. 1 is a diagram of an exemplary embodiment for a device 1100. Data security is accomplished by encrypting data within an application 1121 to prevent unauthorized use of the data as it is transmitted to other applications within the device 1100 or when the data is transmitted out of the device 1100. This ensures that any data leaving the OS-protected address space 1137 of the application 1121 is protected. Data encryption is accomplished using data encryption application software 1123 that converts a plaintext message into cipher text that can be decoded back into the original message, such as the block or stream cipher based encryption schemes.

Data encryption provides limited protection from unauthorized use, because the data is still subject to malicious use via direct-memory 1141 access while the application is executing. It may not be possible for an application 1121 to detect when its memory 1141 is being read. However it is possible to detect when an application requests kernel, or super-user, privileges on the device 1100. Elevated access 1130 to the kernel 1137 are required for an application, such as malware, to read another application's memory. There are also other methods to detect when malware has altered a device's hardware and software stack 1110 such as monitoring changes in software executables that report what processes are running on the device 1100 and with what privileges; or monitoring the contents of the boot partition of persistent memory, such as flash memory 1141, to detect rootkits. Typical malware detection and removal solutions such as antivirus, spyware, firewalls, trusted platform modules, and tripwire are limited because rootkits have methods of modifying underlying device components in a manner that allows malware to evade detection by typical malware detection and removal solutions. To counter this integrity issue, the invention takes an initial inventory and content scan of the device's hardware and software stack 1110 when it is in a known-good configuration. The software stack may include different components such as applications, application framework, libraries, OS, kernel, and drivers.

The known-good configuration may include the state when the device 1100 is originally configured at the factory, by a user, or an IT entity. The known-good configuration may also be determined statistically by comparing the configuration of multiple similar devices. Periodic monitoring of the device's hardware and software stack 1110 and comparisons to the known-good condition further ensures the device's 1100 integrity.

The devices 1100 and 1200 may include smart phones, tablet PC's, notebook PC's, desktop PC's, remote monitoring devices, cameras, sensors, or any other device that transmits data across applications within the device, or transmits data out of the device. The devices 1100 and 1200 may be used for any type of communication, computing, or electronic operation. The invention is also applicable to both mobile devices 1100 and fixed devices 1200 since either type typically includes multiple software applications 1120 and 1220 that transmit data to and from each other. Likewise mobile 1100 and fixed 1200 devices are commonly used to transmit data to and from other mobile and fixed devices.

Application software 1121 is installed on the device 1100. The application software 1121 may include any type of software that stores, processes, or transmits data to other applications on the device, or to other devices such as internet browsers, email, word processing, gaming, data analysis, software applications.

The device 1100 also includes application software designed specifically to perform data encryption 1123 and remote attestation software 1125. This application software is installed within the device 1100 and coupled to the device's hardware and software stack 1110. For example, the application software 1120 is installed within the user space of the device's software stack 1110 and associated with various hardware 1140 on the device such as data storage 1141, local interfaces 1143, and remote interfaces 1145. The data storage 1141 may include persistent memory such as flash that may be subdivided for example into user data, system image, and boot partitions.

The devices are previously configured for data encryption and remote attestation. Application software is installed in the device to encrypt data entering and leaving any secured applications within the device, and all data leaving the device. Data security is accomplished by encrypting data within the application to prevent unauthorized use of the data as it is transmitted to other applications within the device or when the data is transmitted out of the device. This ensures that any data leaving the OS-protected address space of the secure application is protected. The data encryption is accomplished using a data encryption process that converts a plaintext message into cipher text that can be decoded back into the original message, such as the block or stream cipher based encryption schemes.

The application software is installed 2200 in the device to enable remote attestation including modifying 2300 the hardware and software stack so the attestation server will be able to remotely command the device to perform inventory and content scans of the device's hardware and software stack. This includes providing direct access to the device's memory because the remote attestation process includes monitoring requests from malicious applications for elevated permissions and scanning critical platform items such as drivers, and memory user data, system image, and boot partitions. Additionally the application software includes commands and instructions to take an initial and periodic inventory and content scans 2400 of the device's hardware and software stack when it is in a known-good state. The inventory and scan include a variety of tasks such as the boot image of the device, the system image that contains the operating system, any user-programmable areas that contain software or data files, and an inventory of software installed on the device. Finally, the results of the initial inventory and content scan of the device's hardware and software stack are transmitted 2500 across a communication network to the attestation server.

Figure 2:
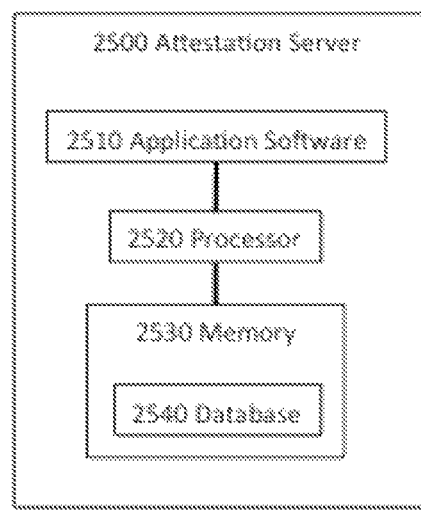
FIG. 2 is a diagram illustrating an attestation server in accordance with the teachings of the present invention.

FIG. 2 illustrates an attestation server 2500 which the device 1100 communicates with through the communication network. The attestation server 2500 coordinates the application software instructions, database, collection of message digest data, and processor to determine a statistically known-good configuration for the devices. The remote attestation server 2500 may be a server, router, personal computer, or other device capable of receiving data communicated to and from the mobile or fixed devices. The remote attestation server 2500 includes hardware and software components such as a communication network interface, database 2540, memory 2530, processor 2520, and application software 2510. The database 2540 is used to store data received from the mobile or fixed devices. The database 2540 may be stored in memory 2530 within the attestation server 2500, or in memory outside the attestation server 2500 and retrieved upon request, including volatile and non-volatile memory such as flash, cache, RAM, ROM, solid state drives, hard disk drives, or secondary memory such as tape, magnetic disks and optical discs. The processor 2520 carries out the instructions of the application software 2510 performing the basic arithmetical, logical, and input/output operations of the attestation server 2500.

The application software 2510 installed on the attestation server 2500 provides the instructions to remotely command the device 1100 (referring to FIG. 1) to perform inventory and content scans of the device's hardware and software stack 1110. The application software 2510 also provides the instructions to: consolidate and secure the results of the inventory and content scan of the device's hardware and software stack 2110; store the results in a storage database 2540; to use the collected results to determine a statistically known-good configuration for each type of device; to compare the results with the statistically known-good configuration for the particular type of device; to note any differences in the most recent message digest compared to the determined statistically known-good configuration; and to send an alert to the device 1100.

Figure 3:
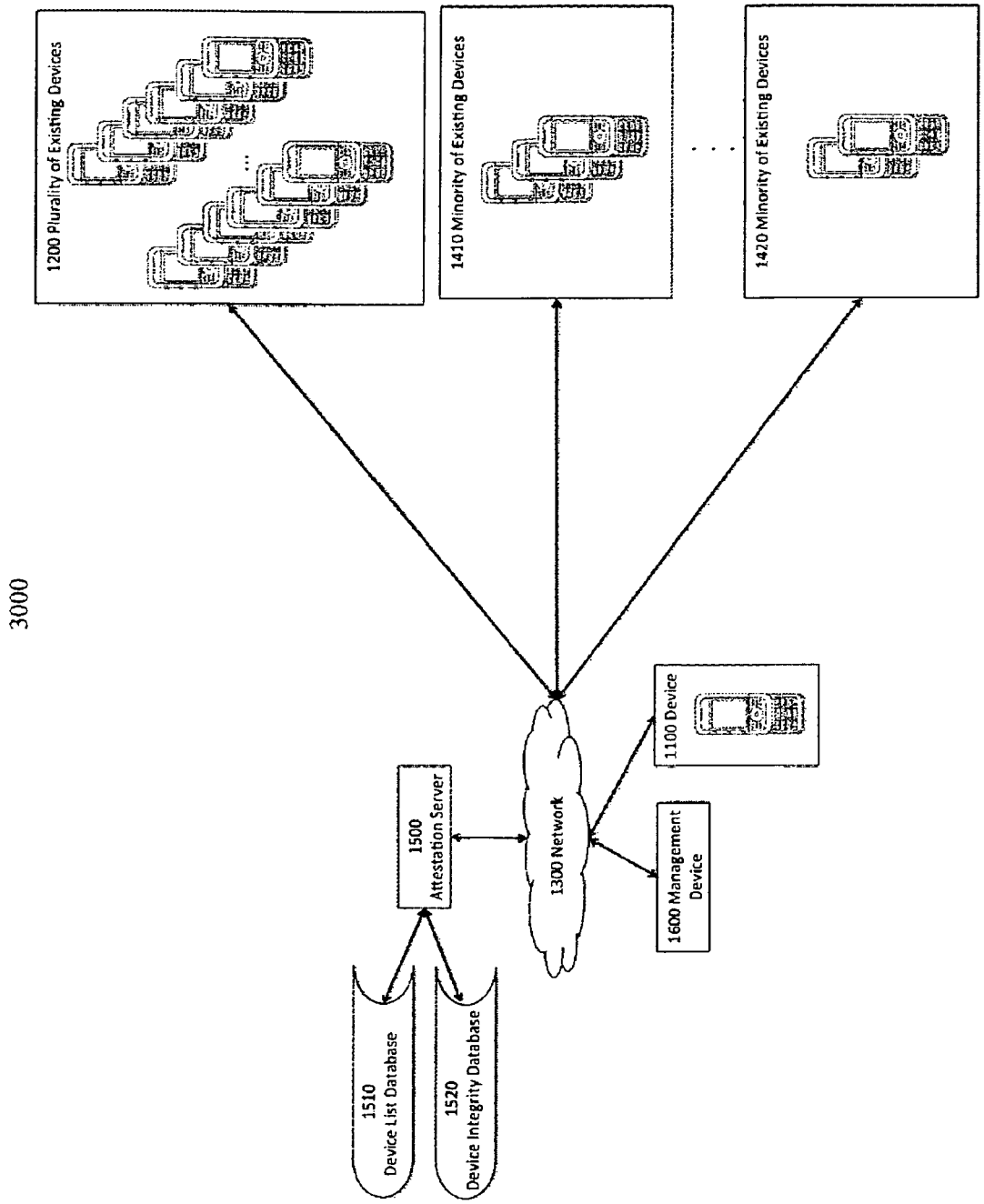
FIG. 3 is a diagram illustrating the system for ensuring the security and integrity of computing, or electronic mobile and fixed devices in accordance with the teachings of the present invention.

FIG. 3 is a diagram of an exemplary embodiment 3000 for repairing a corrupted device 1100 still in the field by sending the corrupted device 1100 a known-good configuration derived from the majority group, or plurality of devices 1200 in the field. First, an inventory and content scan of the device's 1100 hardware and software stack is taken. The inventory and scan include a variety of tasks including the boot image of the device, the system image that contains the operating system, any user-programmable areas that contain software or data files, and an inventory of software installed on the device 1100.

This invention does not require that a good configuration be known. Instead the invention provides a process to gather the results of multiple inventory and content scans of a particular type of device, i.e. the plurality of existing devices 1200. Each particular type of device is expected to generate a signature result. The invention determines a statistical known-good configuration based on the signature result of multiple devices of the same type. Thus the results of the inventory and content scan of the device can be compared to the statistically determined known-good configuration of similar device types, i.e. the configuration for the plurality of existing devices 1200.

The result of the inventory and content scan of the device 1100 is transmitted across a communication network 1300 to the attestation server 1500. In order to reduce the bandwidth needed to transmit the result of the inventory and content scan of the device's hardware and software stack, the results are compressed and encrypted 3300 using an algorithm such as a cryptographic hash function. The cryptographic hash function is a deterministic procedure that takes an arbitrary block of data and returns a fixed-size bit string, commonly referred to the hash value or message digest. Any change to the data, accidental or intentional, will change the hash value. Thus the message digest can be used to determine when there is a change to the device's hardware or software stack, which may indicate a malicious attack on the device's data or platform integrity. Thus the results of the inventory and content scan of the device's hardware and software stack are transmitted across a communication network 1300 to the attestation server 1500 in the form of the secure and compressed message digest.

Next, the attestation server 1500 stores the consolidated and encrypted results of the inventory and content scan of the device's hardware and software stack in a storage databases (1510 and 1520) for comparison to other results sent by the plurality of existing devices 1200, as well as from the different minority of existing devices 1410 and 1420. The databases are used to store the results from message digests received from the devices. The databases may be stored in physical memory within the attestation server including volatile and non-volatile memory such as flash, cache, RAM, ROM, solid state drives, hard disk drives, or secondary memory such as tape, magnetic disks and optical discs, or in memory outside the attestation server 1500.

The attestation server 1500 uses the collection of all results to determine a statistically known-good configuration for each type of device, herein referred to as the "configuration for the plurality of existing devices." The attestation server 1500 groups the known good devices by device type and ideally all of the devices of the same type are configured mostly the same (i.e. the "configuration for the plurality of existing devices"). The attestation server will compare the most recent results from the inventory and content scan with the configuration for the plurality of existing devices 1200. The attestation server's application software provides the instructions to store the message digest in a storage database. The database keeps track of all message digests from all devices including separating the data by the device type. For example, all data from a particular type of smartphone will be stored and processed together. The attestation server 1500 will use the data from a particular type of device to determine a statistically known-good configuration, or the configuration for the plurality of existing devices 1200. For example, the attestation server 1500 may use the collection of data to determine the configuration for the plurality of existing devices 1200 relative to the average, mean, a range, or any other statistically determined criteria of cryptographic hash values—or message digest values—reported by multiple devices of the same type. Thus an anomaly, or corrupted device, may be detected when a device reports a message digest value different from the configuration for the plurality of existing devices. Such corrupted devices may also be categorized by the attestation server 1500 as a minority of existing devices 1410. There may also be several groups of minority of existing devices representing different types of malware types. For example, the first group of minority of existing devices 1410 may represent devices corrupted with a specific type of malware and the other group of minority of existing devices 1420 may represent devices corrupted with a different type of malware. The attestation server 1500 may also store and process message digest values based on other traits such as the geography the devices are located, manufacturer, brand, the user's function, permissions granted, etc.

Next, the attestation server 1500 compares the most recent results to configuration for the plurality of existing devices 1200. The attestation server 1500 sends an alert to the device 1100 that the device 1100 is configured differently than the plurality of existing devices 1200. The device 1100 that is configured differently than the plurality of existing devices 1200 is categorized by the attestation server 1500 as a minority group 1410. If no differences were noted the attestation server 1500 may send an alert to the device 1100 indicating that the device 1100 is configured the same as the determined statistically known-good configuration, or plurality of existing devices 1200. The comparison may include any difference determined to be indicative of an anomaly, and thus an indication that the device 1100 was altered. For example, the attestation server 1500 may be programmed to indicate that the device 1100 was altered by malware if the most recent message digest differs by a value known to indicate the signature of malware. It may also be advantageous for the alert to be provided to the user by an alternate means outside the control of the device 1100 (i.e. an out-of-band message) such as by browser, email, call, or text message on a different device—thus avoiding spoofing by the malware.

Finally, the attestation server 1500 will request a known-good configuration (e.g. the boot image of the device, the system image that contains the operating system, any user-programmable areas that contain software or data files, and an inventory of software installed on the device) from one of the devices in the plurality of existing devices 1200. The attestation server 1500 will then provide the known-good configuration to the corrupted device 1100 so the corrupted device 1100 can be reconfigured back to the known-good state, or the same configuration as the plurality of existing devices 1200.

The device 1100 and attestation server 1500 may also be programmed to automatically take actions to initiate the request for the configuration from the plurality of existing devices 1200. For example, the device 1100 may automatically be re-configured back to a known-good condition using the configuration from the plurality of existing devices 1200.

Additional services may be built on top of the remote attestation system to further enhance the security of the device. For example, services such as generating a manifest of installed software to compare against a central whitelist database; remote software installation and removal for both secure and commercial software; and generating a report of permissions granted to installed software as well as providing remote modification of those permissions.

Throughout this description, references were made to devices coupled together. Such coupling includes a manner that allows the exchange and interaction of data, such that the operations and processes described may be carried out. For example, the devices may be coupled with electrical circuitry, or through wireless networks that allow the devices to transfer data, receive power, execute the operations described, and provide structural integrity. Reference was also made to interactions between a device, communication network, and an attestation server, however the invention is scalable to be enabled with more devices, networks, and attestation servers than described in the specification. For example, any number of devices, networks, or attestation servers may be utilized to enable this invention.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method to repair a first device that has been corrupted in a field by sending the first device that has been corrupted a known-good configuration derived from a majority of devices from a first set of devices in the field comprising:
    an attestation server remotely commanding the first set of devices and the first device to provide direct access to a kernel memory of each of the first set of devices and the first device to: monitor any access to the kernel memory, perform an inventory and content scan of the hardware stack and the software stack of all of the first set of devices and the first device, generate a fixed-size bit string hash value by using a cryptographic hash function that takes an arbitrary block of data that represents a result of the inventory and content scan of the hardware stack and the software stack and access to the kernel memory and return the fixed-size bit string hash value, and to send the fixed-size bit string hash value for each device to the attestation server;
    the attestation server automatically using the fixed-size bit string hash value from the first set of devices to determine a statistically known-good configuration;
    the attestation server using the known-good configuration and the fixed-size bit string hash value from the first device to automatically detect a change to the hardware stack or software stack or access to the kernel memory of the first device;
    the attestation server automatically providing the known-good configuration to the first device so the first device can automatically reconfigure itself back to the known-good configuration.

2. The method of claim 1, wherein the inventory and content scan of the hardware and software stack include capturing a boot image a system image that contains an operating system, any user-programmable areas that contain a software or a data file, and an inventory of software.

3. The method of claim 1, wherein a multitude of fixed-size bit string hash values from a multitude of inventory and content scans of a particular type of device are gathered to determine a signature for the particular type of device.

4. The method of claim 3, wherein the known-good configuration is determined based on the signature for the particular type of device.

5. The method of claim 1, wherein the attestation server stores the fixed-size bit string hash value of the first set of devices in a physical memory within the attestation server.

6. The method of claim 1, wherein the attestation server keeps track of the fixed-size bit string hash value from the first set of devices including separating the fixed-size bit string hash value from the first set of devices by each type of device and using the fixed-size bit string hash value from the first set of devices for each type of device to determine a known-good configuration for each type of device.

7. The method of claim 1, wherein the fixed-size bit string hash value is generated by using an arbitrary block of data that represents a manufacturer, a brand, a user's function, or a set of permissions of a device.

8. The method of claim 1, wherein the known-good configuration is determined based on a manual indication from a user of a device.

9. The method of claim 1, wherein a user of the first device takes action to request from the attestation server the known good configuration for the first set of devices if the user suspects the first device to be compromised.

10. The method of claim 1, wherein the first device automatically request the known good configuration at predetermined intervals.

11. A system to repair a first device corrupted in a field by sending the first device a known-good configuration derived from a first set of devices in the field comprising:
- a first device with an application, a data encryption, and a remote attestation software installed on the first device and coupled to a hardware stack and a software stack of the first device;
- the first device coupled to a network;
- an attestation server enabled to remotely command all of the first set of devices and the first device, and to remotely obtain direct access to a kernel memory of each of the first set of devices and the first device to: monitor any access to the kernel memory, perform an inventory and content scan of the hardware stack and the software stack of all of the first set of devices and the first device, generate a fixed-size bit string hash value by using a cryptographic hash function that takes an arbitrary block of data that represents a result of the inventory and content scan of the hardware stack and the software stack and access to the kernel memory and return the fixed-size bit string hash value, and to send the fixed-size bit string hash value for each device to the attestation server;
- wherein the attestation server is configured to automatically use the fixed-size bit string hash value from the first set of devices to determine a statistically known-good configuration, the attestation server configured to use the known-good configuration and the fixed-size bit string hash value from the first device to automatically detect a change to the hardware stack or software stack or access to the kernel memory of the first device, and the attestation server configured to automatically send an alert to the first device indicating the first device is configured differently than the known-good configuration; and
- the attestation server automatically providing the known-good configuration to the first device so the first device can automatically reconfigure itself back to the known-good configuration.

12. The system of claim 11, wherein the encryption and remote attestation software is installed within a user space of the software stack of each device and associated with various hardware on each device including a data storage, a local interface, and a remote interface.

13. A non-transitory computer-readable medium which stores a set of instructions which when executed performs a method for repairing a corrupted device in the field comprising:
- storing, in each attestation server that is in communication with a device via the network, an application automatically configured to effect, by the attestation server,
- commanding remotely the first set of devices and the first device to provide direct access to a kernel memory of each of the first set of devices and the first device to: monitor any access to the kernel memory, perform an inventory and content scan of the hardware stack and the software stack of all of the first set of devices and the first device, generating a fixed-size bit string hash value by using a cryptographic hash function that takes an arbitrary block of data that represents a result of the inventory and content scan of the hardware stack and the software stack and access to the kernel memory and return the fixed-size bit string hash value, and to send the fixed-size bit string hash value for each device to the attestation server;
- automatically using the fixed-size bit string hash value from the first set of devices to determine a statistically known-good configuration;
- using the known-good configuration and the fixed-size bit string hash value from the first device to automatically detect a change to the hardware stack or software stack or access to the kernel memory of the first device;
- automatically sending an alert to the first device indicating the first device is configured differently than the known-good configuration; and
- automatically providing the known-good configuration to the first device so the first device can automatically reconfigure itself back to the known-good configuration.

* * * * *